Feb. 25, 1969         J. E. LINDBERG         3,429,183
            TEMPERATURE AVERAGING SYSTEM
              Filed July 14, 1966
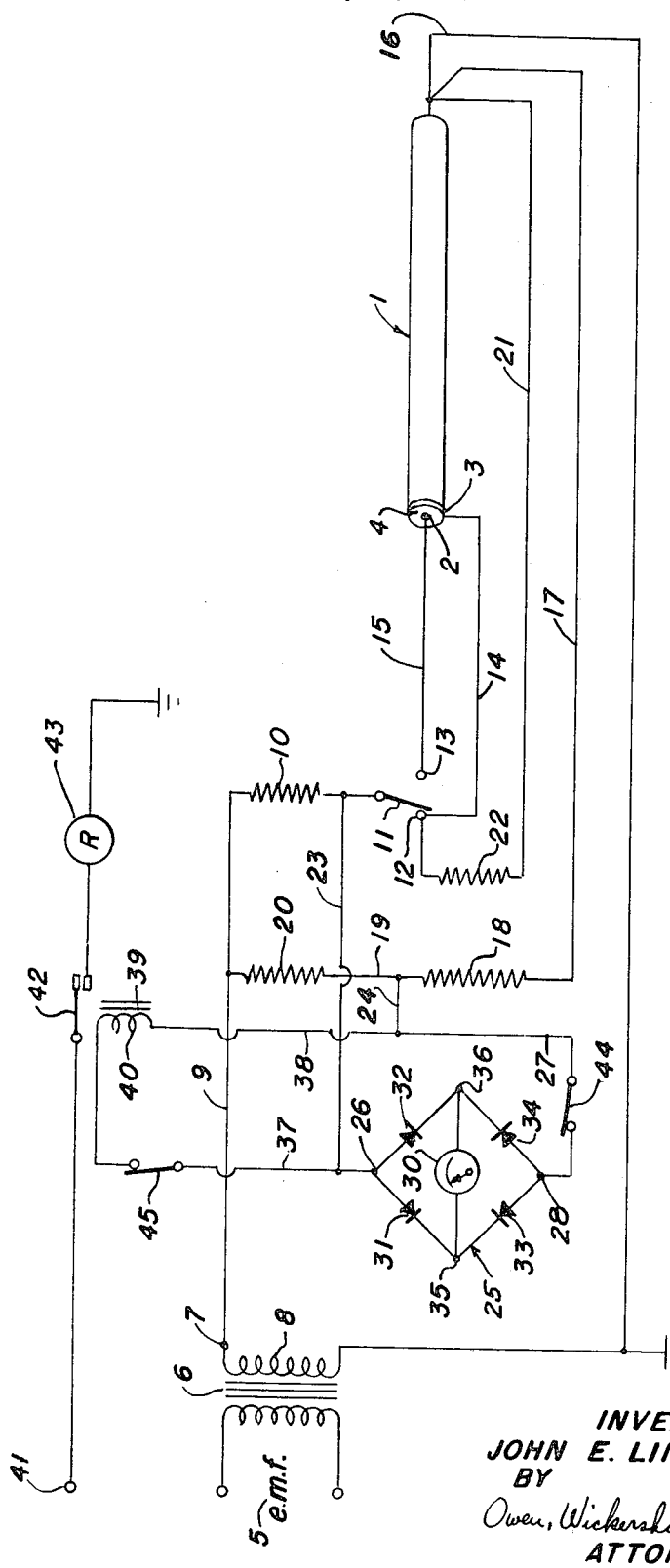
INVENTOR
JOHN E. LINDBERG
BY
*Owen, Wickersham, & Erickson*
ATTORNEYS United States Patent Office 3,429,183
Patented Feb. 25, 1969

3,429,183
TEMPERATURE AVERAGING SYSTEM
John E. Lindberg, 1211 Upper Happy Valley Road,
Lafayette, Calif. 94549
Filed July 14, 1966, Ser. No. 565,161
U.S. Cl. 73—362                              8 Claims
Int. Cl. G01k 5/18; G08b 21/00

ABSTRACT OF THE DISCLOSURE

A combined fire detector and average temperture measurement device, having a unitary detector responsive to both conditions which is connected in a bridge circuit. The detector has center conductor with a high linear temperature coefficient of resistivity positioned coaxially to a conductive tubular housing and separated by a critical temperature responsive material. The bridge circuit contains switching devices which connect either the center conductor and an indicating circuit for sensing average temperature or the critical temperature sensor and an alarm through the bridge circuit.

---

This invention relates to temperature averaging, particularly to apparatus for indicating the average temperature along a path.

Among instances where it is useful to know the average temperature of a path, are some related to airplane fire detection; there it is often important not only to sense a critical maximum fire temperature along the path of a continuous-type fire detector sensor, thereby indicating a flame at some location therealong, but also to see that the average over-all temperature does not exceed certain values. In some instances it is desired to know the value of the average temperature. Temperature averaging is a feature of several of my inventions, in particular that disclosed in U.S. Patent No. 3,237,179. However, in systems which use such a completely different type of sensor as the semiconductor type, it has not heretofore been possible to determine the average temperature along the path of that continuous semi-conductor type of sensor. The present invention enables one to do just this, and therefore is useful in many situations where average temperature indication is desirable. As will be shown, it need not exclude the use of the fire-detection sensor in its normal manner.

Other objects and advantages of the invention will appear from the following description of a preferred form thereof.

The drawing is a circuit diagram of a temperature averaging system embodying the principles of the invention.

In the drawing is illustrated diagrammatically a fire detection element 1 of the semi-conductor type, having a central wire 2 separated from a tubular housing 3 by a semi-conductor 4. (A well-known equivalent type has two wires both embedded in and separated by a semi-conductor, and other constructions equivalent for the purposes of this invention are also known.) The semi-conductor 4 is ordinarily a high-resistance material, but when fire conditions occur, the high temperature rather abruptly reduces its resistance to a relatively low value, which is readily detected by means of a resistance bridge. However, as noted, this type of detector 1, while satisfactory for many conditions, has not heretofore been able to average the temperatures along its path. In the present invention temperature averaging is achieved by the use of a double bridge type of circuit and by utilizing one of the conductors 2 or 3, preferably the center conductor 2, as a detection element.

In this system there is preferably a source 5 of alternating current power; the voltage and frequency may be widely varied, and no particular values need be given, since common AC values are quite satisfactory, such as the sixty-cycle 110-volt type of current or a lower voltage available in airplanes may be used. The AC power may be converted to any desired voltage by use of a transformer 6, one end 7 of the secondary 8 of which is connected by a lead 9 to a resistor 10, which in turn is connected to a switch 11. The switch 11 is of the single-pole double-throw variety that enables the operator to use either of two modes of operation, going either to a contact 12 for fire detection or to a second contact 13 for average temperature measurement. While the switch can be in only one of these two positions at any one time, it can be instantly changed to the other.

When the switch 11 is connected to the contact 12 for fire detection, a lead 14 is connected to the sensor's outer conductor 3. When the switch is connected to the contact 13, a lead 15 goes to the central wire 2.

At the opposite end of the first detector 1 there is a connection 16 from the center wire 2 to ground; a lead 17 to a resistor 18, and thence by a lead 19 to a resistor 20 to the lead 9; there is also a lead 21 connecting the center conductor 2 to a resistor 22 and thence to the terminal 12. All four resistors 10, 18, 20, and 22 are identical, i.e., all of the same value of resistance, and this value corresponds to, in this invention, the resistance of the center conductor 2, which is preferably of a metal having a high-temperature linear coefficient of resistance, such as nickel, so that small changes of temperature cause relatively large changes of resistance.

Between the resistor 10 and the switch 11 there is connected a lead 23, and between the two resistors 18 and 20 is connected a lead 24. The lead 23 is connected to one end 26 of a rectifier bridge 25. The lead 24 goes via a lead 27 to the other end 28 of the rectifier bridge 25, which comprises a meter 30 and four rectifiers 31, 32, 33, and 34 arranged substantially as shown in the drawing with one in each direction connected to each end 26 and 28 and with the ones connected to opposite ends connected in opposition. Between the two remaining points 35 and 36 of the bridge is the meter 30, which may be a suitable voltmeter. When a warning system is desired, as for using the apparatus for fire detection or, if desired, a warning for a critical average temperature, leads 37 and 38 connect the leads 23 and 24 to the coil 39 of an electrical relay 40 of the AC type. Another source of power 41, which may be either DC or AC is connected to a relay-controlled switch 42, which is normally open and is closed upon energization of the relay 40 to a warning device 43, which may be a lamp or a bell or other suitable signal.

Thus, in the system there are two bridge circuits, one the rectifier bridge 25 and the other a resistance bridge incorporating the resistors 10, 18, 20, and 22. The meter 30 indicates unbalance of the bridge 25. The device is made to give zero output at the lowest average temperature to be indicated (when the device is in the average-temperature mode) because the resistances 10, 18, and 20 are all equal and equal the resistance of the center conductor 2 at that temperature.

In the fire detector mode, the electrical resistance of the semi-conductor 4 is so great that the balance of the bridge 25 is virtually unaffected. It is as though the sensor 1 were not there, since it is in parallel with the resistor 22, and that resistor 22 acts substantially at its value until a critical high temperature, such as from flame, causes the semiconductor material to break down resistance-wise, becoming a conductor in parallel with the resistor 22 and thereby greatly reducing the value of this resistance branch of the bridge, thereby unbalancing the resistance bridge. The AC voltage then appears across the coil 39 of the relay 40, which energizes the relay and causes the contact 42 to close, thereby turning on the light or other warning device 43. At the same time, the rectifier bridge 25 is unbalanced, and a voltage appears across the meter 30, causing an up-scale deflection, which may be uncalibrated. If desired, a switch 44 may be added to cut out the meter circuit when the unit is in the fire-detection mode, preferably being ganged with the switch 11.

In the average temperature mode, with the switch 11 on the contact 13, both the semi-conductor 4 and the resistor 22 are switched out of the circuit, and the center conductor 2 of the sensing element 1 is thus connected to the place in the bridge formerly occupied by the resistor 22. This center wire 2, being of the type having a linear and high temperature coefficient of resistance, responds readily to relatively small changes in temperature. With the resistance initially chosen to balance the bridge 25 at a desired low temperature, unbalance will be expressed at other temperatures, for any change of temperature unbalances the bridge 25 and causes an AC voltage to appear across the meter 30, so it is desired that the original or base temperature be the lowest one. The meter 30 may be scaled and calibrated to read directly in temperature, giving the actual temperature values, since the amount of deflection of the meter 30 is proportional directly to the average temperature over the length of the sensing element 1.

The relay 40 may be adjusted to actuate at any desired temperature; that is, it may be adjusted so that the voltage applied due to that temperature will be a critical one. Or the relay 40 may be switched out, by a switch 45, if that is desired.

While an example has been given, other circuits may be used, so long as they meet the requirement of responding to a change of resistance of the sensing element. Thus, DC power may be used, but AC is chosen here because then any change of resistance, whether an increase or a decrease, causes an upscale movement of the indicator 30. It will be noted that in the fire detection mode, the unbalance of the bridge 30 is due to a decrease in resistance in one branch, while in the average temperature mode it is due to an increase in resistance in the wire 2. If DC is used, then the meter 30 should be of a type which has a center point and moves both to the right and the left, and the relay 40 should be a DC type.

To this skilled in the art to which this invention relates, many changes in construction and widely differing embodiments and applications of the invention will suggest themselves without departing from the spirit and scope of the invention. For example, instead of being a semi-conductor, the element 4 may be a metallic salt; the behavior is similar and the ultimate results identical. Besides bridges, other devices for measuring resistance may be used, such as any ohmmeter. Inductance or capacitance may be used as well as resistance, for the reactance value is what is significant. The disclosures and the description herein are purely illustrative and are not intended to be in any sense limiting.

I claim:
1. An average temperature detecting device, including in combination
   a detecting conductor having a high and linear temperature coefficient of reactance, extending along a path whose temperature is to be averaged, said detecting conductor comprising a wire of a continuous fire-detecting element, having means for providing a normally high resistance and for providing a relatively low resistance when heated to a critical temperature interposed between said center wire and an additional conducting element,
   a first reactance having a value equal to that of said detecting conductor at a predetermined relative low average temperature, in series with said detecting conductor,
   second and third reactances in series with each other and in parallel with said first reactance and said detecting conductor, each having a reactance value equal to that of said first reactance, said detecting conductor and said first, second, and third reactances thereby comprising a bridge,
   a source of electrical power connected to said conductor and said reactances,
   means for indicating an unbalance in the bridge caused by an increase in reactance in any portion of said detecting conductor, thereby indicating an unbalance voltage corresponding to the average temperature of said detecting conductor,
   a fourth reactance of the same value as said first, second, and third reactances,
   a switch for disconnecting said wire from the circuit while connecting said fire detecting element in its place and then connecting in parallel therewith said fourth reactance,
   a relay in parallel with said rectifier bridge, and
   a warning device actuated by energization of said relay.
2. An average temperature detecting device, including in combination
   a detecting conductor having a high and linear temperature coefficient of reactance, extending along a path whose temperature is to be averaged,
   a first reactance having a value equal to that of said detecting conductor at a predetermined relative low average temperature, in series with said detecting conductor,
   second and third reactances in series with each other and in parallel with said first reactance and said detecting conductor, each having a reactance value equal to that of said first reactance, said detecting conductor and said first, second, and third reactances thereby comprising a bridge,
   a source of electrical power connected to said conductor and said reactances, and
   means for indicating an unbalance in the bridge caused by an increase in reactance in any portion of said detecting conductor, thereby indicating an unbalance voltage corresponding to the average temperature of said detecting conductor,
   said means for indicating comprising
   a rectifier bridge of four rectifiers having two opposite ends, one connected between said first reactance and said conductor and the other connected between said second and third reactances, and having two other points, and
   a voltmeter connected across said other points of said rectifier bridge to indicate an unbalance in the bridge caused by an increase in reactance in any portion of said detecting conductor.
3. An average temperature detecting device, including in combination
   a detecting conductor having a high and linear temperature coefficient of resistance, extending along a path whose temperature is to be averaged,
   a first resistor having a resistance equal to that of said detecting conductor at a predetermined relative low average temperature, in series with said detecting conductor,
   second and third resistors in series with each other and in parallel with said first resistor and said detecting conductor, each having a resistance equal to that of said first resistor,
   a source of electrical power connected to said conductor and said resistors,
   a rectifier bridge of four rectifiers, connected in bridge fashion to said three resistors and conductor, and
   a voltmeter connected across said rectifier bridge to indicate an unbalance in the bridge caused by an increase in resistance in any portion of said detecting conductor, thereby indicating an unbalance voltage corresponding to the average temperature of said detecting conductor.
4. The device of claim 3 having a relay in parallel with said rectifier bridge, actuated at a predetermined voltage corresponding to a predetermined average tempera- ture, and a warning device actuated by energization of said relay.

5. The device of claim 3 wherein said detecting conductor comprises a wire of a semi-conductor type of continuous fire-detecting element, having a semi-conductor interposed between said center wire and an additional conducting element.

6. The device of claim 5 wherein there is a switch for disconnecting said wire from the circuit while connecting said fire detecting element in its place and then connecting in parallel therewith a fourth resistor of the same value as said first, second, and third resistors, and a relay in parallel with said rectifier bridge, and a warning device actuated by energization of said relay.

7. An average temperature detecting device, including in combination
 a detecting conductor having a high and linear temperature coefficient of resistance, extending along a path whose temperature is to be averaged,
 a first resistor having a resistance equal to that of said detecting conductor at a predetermined relative low average temperature, in series with said detecting conductor,
 second and third resistors in series with each other and in parallel with said first resistor and said detecting conductor, each having a resistance equal to that of said first resistor,
 a source of electrical power connected in series with said first resistor and said conductor and, in a parallel arrangement connected in series with said second and third resistors,
 a rectifier bridge of four rectifiers having two opposite ends, one connected between said first resistor and said conductor and the other connected between said second and third resistors, and having two other points, and
 a voltmeter connected across said other points of said rectifier bridge to indicate an unbalance in the bridge caused by an increase in resistance in any portion of said detecting conductor, thereby indicating an unbalance voltage corresponding to the average temperature of said detecting conductor.

8. The device of claim 7 wherein said detecting conductor comprises a center wire of a semi-conductor type of continuous fire-detecting element, having a semi-conductor interposed between said center wire and an additional conducting element, a switch for disconnecting said center wire from the circuit while connecting in its place a parallel network consisting of said fire detecting element and a fourth resistor of the same value as said first, second, and third resistors, a relay in parallel with said rectifier bridge, and a warning device actuated by energization of said relay.

References Cited

UNITED STATES PATENTS

| | | | |
|---|---|---|---|
| 2,694,930 | 11/1954 | Lamb et al. | |
| 2,753,713 | 7/1956 | Mabey | 73—342 |
| 2,941,192 | 6/1960 | Postal | 340—228 |
| 2,981,938 | 4/1961 | Carbauh. | |
| 3,044,050 | 7/1962 | Abromaitis | 340—233 |
| 3,175,206 | 3/1965 | Lindberg et al. | 340—228 |

LOUIS R. PRINCE, *Primary Examiner.*

FREDERICK SHOON, *Assistant Examiner.*

U.S. Cl. X.R.

323—75; 340—227, 228, 233